United States Patent [19]

Ehluss et al.

[11] Patent Number: 4,919,064
[45] Date of Patent: Apr. 24, 1990

[54] HYDRAULIC SYSTEM FOR SHIP RUDDER ROLL STABILIZATION AND STEERING

[75] Inventors: Heinz-Günter Ehluss, Tornesch; Erich Wessel; Uwe Oldach, both of Hamburg, all of Fed. Rep. of Germany

[73] Assignee: Blohm & Voss AG, Hamburg, Fed. Rep. of Germany

[21] Appl. No.: 348,178

[22] Filed: May 1, 1989

Related U.S. Application Data

[63] Continuation of Ser. No. 624,045, Jun. 25, 1984, abandoned.

[30] Foreign Application Priority Data

Jun. 23, 1983 [DE] Fed. Rep. of Germany ....... 3322505

[51] Int. Cl.$^5$ .............................................. B63H 25/22
[52] U.S. Cl. .................. 114/150; 114/144 R; 91/509
[58] Field of Search ............... 114/150, 144 R, 144 B, 114/152, 122; 91/509, 510, 4 R; 180/133; 318/585; 60/413

[56] References Cited

U.S. PATENT DOCUMENTS

| | | | |
|---|---|---|---|
| 3,488,954 | 1/1970 | Thomas et al. | 114/150 |
| 3,886,884 | 6/1975 | Stark et al. | 114/275 |
| 4,380,206 | 4/1983 | Baitis et al. | 114/122 |

FOREIGN PATENT DOCUMENTS

| | | |
|---|---|---|
| 2340386 | 2/1975 | Fed. Rep. of Germany . |
| 2502672 | 7/1975 | Fed. Rep. of Germany . |
| 3113933 | 10/1982 | Fed. Rep. of Germany . |
| 983765 | 2/1965 | United Kingdom ................ 114/150 |

OTHER PUBLICATIONS

"Einsatz und Betrieb von Hydrospeichern", 82 O+P Konstruktions-Handbuch, 79/80, vol. 23 (1979) n° 10B, Mainz, pp. 33-36.

Primary Examiner—Joseph F. Peters, Jr.
Assistant Examiner—Jesus D. Sotelo
Attorney, Agent, or Firm—Nils H. Ljungman

[57] ABSTRACT

In a hydraulic system for roll stabilization of a vessel by motions of the rudder an arrangement for supplying a hydraulic fluid to the rudder engine comprises a constant delivery pump, a pressure accumulator, and a valve gear unit. While the valve is opened the hydraulic fluid is delivered by the pump and the accumulator, and when the valve is closed the pump fills up the accumulator to maximum working pressure. The valve gear unit comprises a proportional control valve for controlling period, direction and flow rate of the hydraulic fluid to the steering engine and a load compensation device for controlling the returning flow returning via the proportional control valve for compensating for irregular loads from the waves or the sea against the rudder.

8 Claims, 3 Drawing Sheets

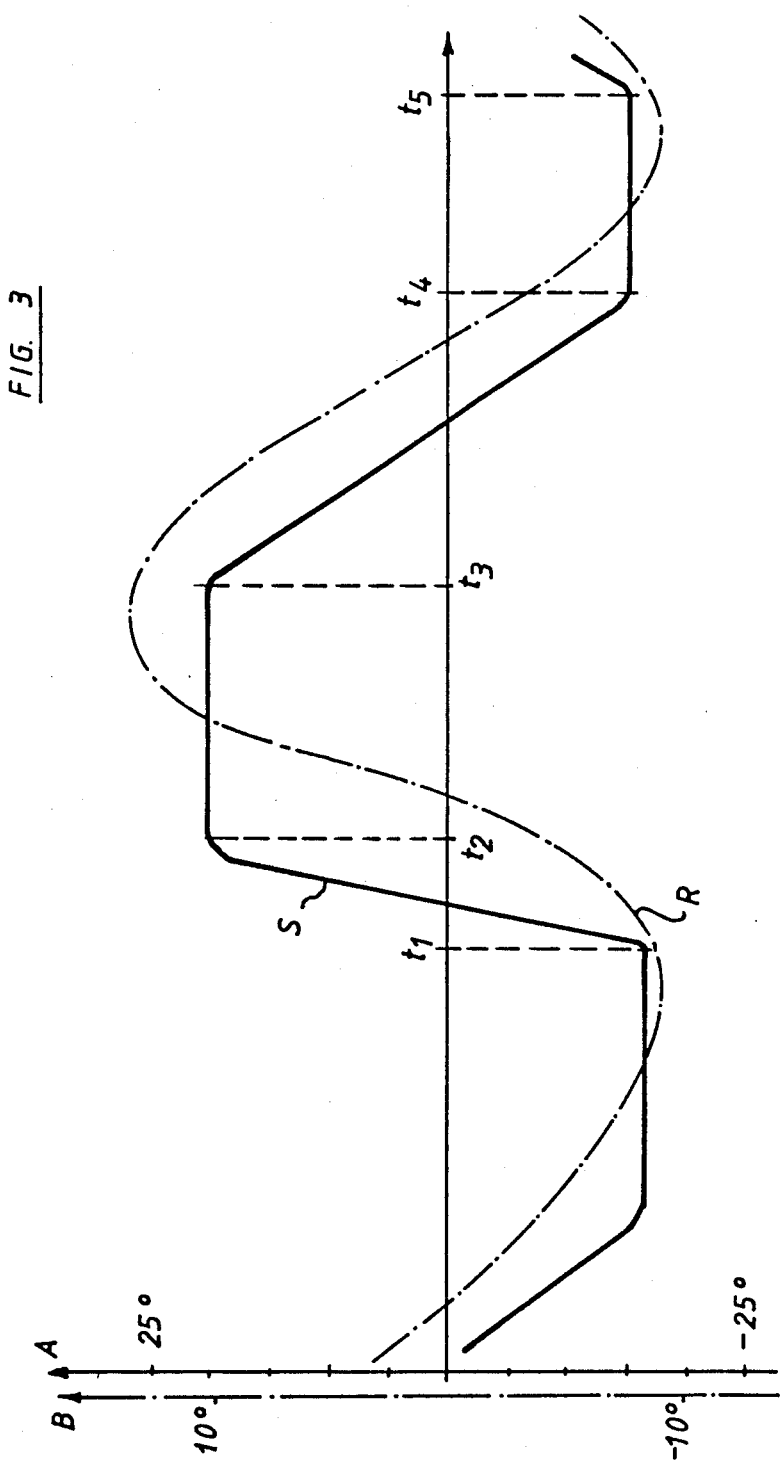

HYDRAULIC SYSTEM FOR SHIP RUDDER ROLL STABILIZATION AND STEERING

This application is a continuation of U.S. application Ser. No. 624,045, filed on June 25, 1984 now abandoned.

BACKGROUND OF THE INVENTION

The invention relates to improvements in roll stabilization of vessels utilizing the rudder to reduce roll movements and more particularly to an improved hydraulic system for operating the rudder engine to effect stabilization and steering.

Roll movements are often damped or reduced by movable stabilizing fins which are positioned laterally on the hull of a vessel. The fins are operated by reversible hydraulic drives controlled by signals from a roll sensor. It was also already considered to utilize the rudder of a ship for stabilizing. However, usual rudder drives are not suitable to carry out the rudder motions necessary for stabilizing because the rudder rate for steering is relative low. A high rudder rate, as required for ship rudder roll stabilization, can be achieved by enlargement of the rudder drive means particularly of the steering pumps and of the means for driving the pumps, the maximum load of which is needed only occasionally and for short periods.

DESCRIPTION OF PRIOR ART

In U.S. Pat. No. 4,380,206 (granted to Baitis and Woolaver) a ship roll stabilization system is described for reducing the ship roll motions resulting from waves and wind. In this system steering pumps are comprised which are connected to hydraulic steering engines for the rudders. Flow control means are attached to the pumps for controlling the flow rate of fluid through the pumps. The delivery of the pumps is varied by swash plates and depends on roll reduction signals from a roll rate sensor and on helm steering commands. A disadvantage of this hydraulic system is that the variable delivery pumps must be capable of providing for a high flow rate as required for a maximum rapid rudder movement, and also electrical energy for this high flow rate must be available onboard, which results in low efficiency at least as long as no or low delivery is necessary.

SUMMARY OF THE INVENTION

The hydraulic system for ship rudder roll stabilization and steering of the present invention overcomes the problem of selecting the pump means according to a maximum rapid rudder movement and to a maximum rudder rate by providing an accumulator supported constant delivery pump and a valve gear for controlling the flow of the hydraulic fluid to and from the steering engine which moves the rudder. The presure accumulator receives the hydraulic fluid delivered by the constant delivery pump while the valve gear is closed because the rudder has to be retained in a certain position. When the valve gear opens for a motion of the rudder, both the constant delivery pump and the pressure accumulator supply the hydraulic fluid to the steering engine. The valve gear is actuated by signals which depend on steering command signals and/or roll reduction signals. The valve gear is capable of controlling the period, the direction and the flow rate of the hydraulic fluid to the steering engine. The valve gear comprises, preferably, a load compensation device for controlling the flow of the hydraulic fluid returning from the steering engine to a sump or tank, thereby compensating for any loads having an influence upon the rudder If, for reason of safety, a vessel is provided with two steering pumps and valve means for a rudder, the hydraulic system according to the invention can be one of these two systems as it may be utilized also for steering without stabilization.

For vessels with twin rudders and separate hydraulic steering systems for each rudder, an additional hydraulic system according to the invention comprises two valve gears independently actuated for each of the rudder engines but only one accumulator boosted constant delivery pump connected to both the valve gears.

BRIEF DESCRIPTION OF THE DRAWINGS

FIG. 3 is a simplified diagram illustrating the relation between roll motion of an unstabilized vessel and movements of a rudder to compensate for these motions.

DESCRIPTION OF PREFERRED EMBODIMENTS

Figure 1:
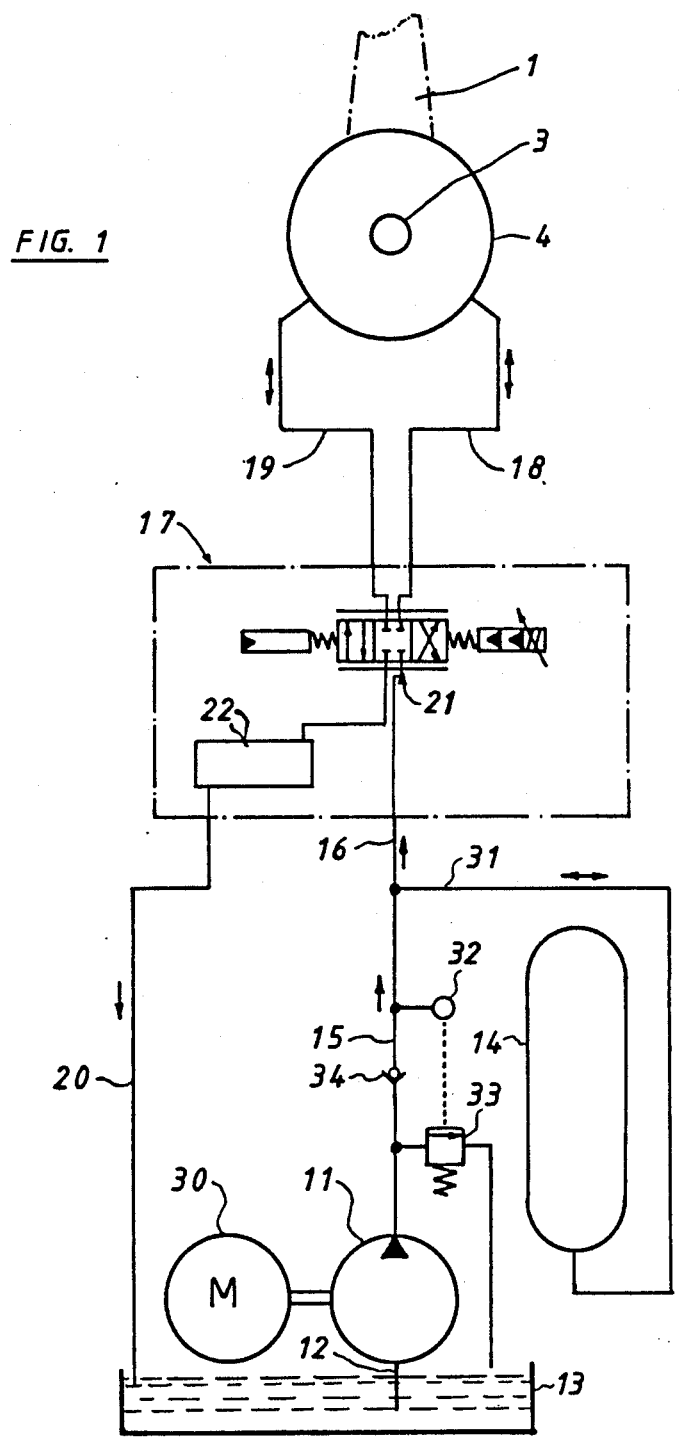
FIG. 1 is a simplified diagrammatic view of the hydraulic system of the present invention for a ship with one rudder which can be utilized for steering, as well as for roll stabilization.

In FIG. 1 only a part of a rudder 1 is shown in dot-dash lines. The rudder head 3 is attached to a rudder engine 4 of the type of a revolving hydraulic motor which can oscillate according to the required rudder angle.

The hydraulic system of the present invention comprises a constant delivery pump 11 connected to a tank 13 by a suction pipe 12. The pump 11 is driven by a motor. The tank 13 contains hydraulic fluid under atmospheric pressure. The delivery pipe line 15 is connected via a connection pipe 31 to a pressure accumulator 14. Pump 11 and accumulator 14 are capable of delivering the hydraulic fluid via a delivery pipe 16 to a valve gear unit 17 which is connected via ducts 18,19 to the steering engine 4. When the steering engine 4 is operated, one of the ducts 18,19 is the delivery line, the other one is the drain line depending on the direction of the rudder motion. The returning hydraulic fluid is guided in the valve gear unit 17 to a drain pipe 20 and is conducted to the tank 13.

The valve gear unit 17 comprises a proportional control valve 21 and a load compensation device 22, which in principle are known in the art for controlling the flow of a liquid medium. The control valve 21 is actuated by electrical signals derived from electrical circuits (not shown) and depends on steering command signals and on roll reduction signals. By means of hydraulic servomotors which are incorporated in the control valve 21, the valve is closed or is brought in a position in which it permits the flow of the hydraulic fluid in the one or in the other direction and in which it is opened more or less to control the flow rate in proportion to the electrical signal. In such a way the proportional control valve 21 is capable to control the direction, the period and the flow rate of the hydraulic fluid from the accumulator supported constant delivery pump 11 into the one chamber of the steering engine 4 and out of the other chamber of the steering engine 4 to the load compensation device 22 and further to the drain pipe 20. The load compensation device 22 is capable of additionally controlling the flow rate and the pressure of the hydraulic fluid returning from the steering engine 4 to the drain pipe 20, thereby compensating for variable loads directed to the rudder by waves or by a blow of the sea so that the rudder rate exclusively depends on the flow supplied by the accumulator boosted pump 11 and regulated by the proportional control valve 21.

The valve gear unit 17 further comprises valves of a different kind, such as check valves and distribution valves and safety means for returning the control valve 21 to a neutral position in case the power supply should be interrupted (all these further valves and parts are not shown).

The constant delivery pump 11 delivers, continuously, hydraulic fluid into a delivery pipe line 15 through a non-return valve 34. If full working pressure is available in the system comprising the accumulator 14 and pipes 15,16,31, a pressure gauge 32 opens a pressure release valve 33, and the delivery is returned into tank 13 without any counter-pressure.

When, for a turn of the rudder 1, the proportional control valve 21 is opened, the hydraulic fluid flows into one of the chambers of the rudder engine 4 whereby, at the beginning of the motion of the rudder, the full working pressure, of e.g. 150 bar, is available from the accumulator 14, and the working pressure is substantially maintained by the delivery of the pump 11 in addition to the delivery from the accumulator 14. After a stroke of the rudder the accumulator is refilled by the pump.

As shown in FIG. 3, turns of the rudder have to lead the roll tendency of the vessel but the rudder remains in a certain position before its next motion. The diagram shows, in dot-dash lines, a possible angle B of inclination of an unstabilized ship which is assumed to roll according to curve R during a certain period T. To compensate for the roll tendency by rudder stabilization, it is assumed that the rudder has to be turned to a rudder angle A and over the shown period moved and maintained according to the curve S in full line.

At a certain moment $t_1$, the rudder has to be turned from starboard to port to an angle of 20 degree with a rudder rate to arrive at that angle at the moment $t_2$. In this position, the rudder remains until at the moment $t_3$, a reverse motion to starboard is required, and so on. In the period between $t_1$ and $t_2$, the proportional valve gear unit 17 is opened for providing a flow of the hydraulic fluid from the pump 11 and from the accumulator 14 to the steering engine 4 so that at moment $t_2$ the rudder is stopped in the required position, whereby the turn rate of the rudder depends on the flow rate controlled by valve unit 17. In the period between $t_2$ and $t_3$, the accumulator is refilled to the full working pressure by pump 11.

The roll frequency, which makes a roll stabilization desirable, is usually about 8 to 10 seconds, but also frequencies between 3 and 30 seconds are possible. Therefore, the rudder angle has to be changed with a rudder rate of up to 45 degrees per second in relative short periods which results in high rudder turning moments and high consumption of energy while turning the rudder. It was found that the periods for turning the rudder generally are not longer than the periods for maintaining the rudder in a certain position. By combination of a constant delivery pump 11 and an accumulator 14, the delivery of the pump can be reduced to 50 percent of the supply to the rudder engine for effecting a maximum rudder stroke, as the other 50 percent of a maximum flow are supplied from the accumulator, the capacity of which should be selected accordingly.

It is advantageous to limit the maximum rudder angle to 25 degrees to each side for stabilizating because, with greater rudder angle, the necessary energy for moving the rudder would be unduly increased and the water stream along the rudders disturbed at normal operation speed of the vessel.

Figure 2:
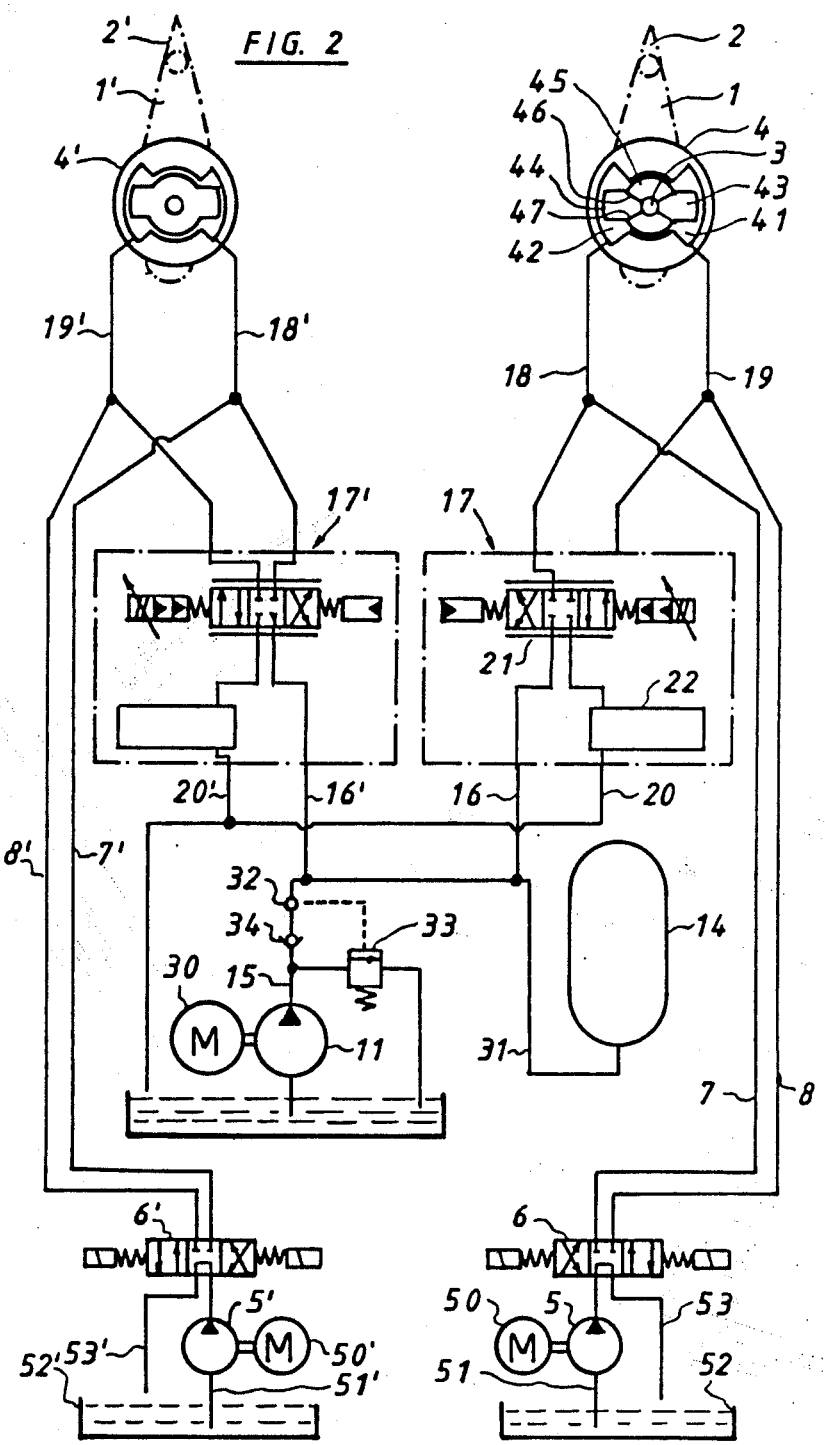
FIG. 2 is a simplified diagrammatic view of the hydraulic system of the invention for roll stabilization and steering of a vessel with twin rudders and additional independent supply means for delivering a hydraulic fluid to each of the steering engines of the rudders for steering.

In FIG. 2 a hydraulic system according to the invention is shown for twin rudders. The parts are essentially the same as described before for one rudder, and some parts used only for the second rudder are identified by additional prime marks, such as a rudder 1', a steering engine 4' and a valve gear unit 17'. As can be taken from FIG. 2, for each of the rudders, a separate valve gear unit 17,17' is preferred but the hydraulic fluid can be supplied by one constant delivery pump 11 supported by an accumulator 14.

Pump 11, accumulator 14 and valve gear unit 17,17' can be regarded as first supply means, and independent second supply means can be provided for safety reasons. Such second supply means are utilized for steering only, i.e. a slow rudder rate of e.g. 5 degree per second is sufficient but a maximum rudder angle of 35 to 40 degree to each side should be possible.

For twin rudders, as shown in FIG. 2, second supply means of conventional kind comprise a steering pump 5,5', an electrically actuated slide valve 6,6' for controlling period and direction of flow of the hydraulic fluid to and from the steering engine 4,4' through ducts 7,7' and 8,8', which are connected to respective ducts 18,18' and 19,19' near the steering engine 4,4'. In the ducts some valves of different kind, which are not shown, can be arranged. The pump 5,5' is driven by a motor 50,50' and is provided with a suction pipe 51,51' which begins in a tank 52,52'. A drain line 53,53' is connected to valve 6,6'. The second supply means are utilized alternately to the first supply means e.g. if stabilization is not necessary.

In FIG. 2 some more details of the rudder engine 4 are shown. The preferred revolving-type rudder gear comprises at least two chambers 41 and 42 in which two wings or rotary pistons 43, 44 can oscillate. Ducts 46,47, arranged about cross-wise through the rotary body 45 mounted to the rudder head 3, connect the part of one chamber e.g. 41 before the piston e.g. 43 with the part of the other chamber e.g. 42 behind the piston e.g. 44, so that pressurized hydraulic fluid supplied via duct 19 enters in chamber 41 before the piston 43 and in chamber 42 behind the piston 44 and rotates the rudder counter-clockwise thereby returning the hydraulic fluid out of the other parts of the chambers via duct 18. The rudders 1,1' shown in FIG. 2 are provided with fins 2,2' which are pivoted on vertical axes at the ends of the rudder blades to which they are linked mechanically. The additional motion of the fins increases the rudder moment for a certain angle of the main rudder blades and respectively reduces the angle of rotation of the rudder engine for a certain rudder moment.

In an arrangement with twin rudders calculated, as an example, for a certain vessel for the accumulator supported constant delivery pump 11, an electrical energy supply of 122 kW was required, whereas for each of the steering pumps 5,5', an electrical energy supply of 20,4 kW was deemed to be necessary. The calculation shows that rudder roll stabilization causes to increase the energy available for turning the rudders essentially in comparison with the energy usual provided for steering. Supporting the delivery pump by an accumulator is therefore important to reduce electrical peak loads on board of a vessel which is provided with a stabilization system.

The invention is not to be taken as limited to all the details that are described hereinabove, since modifications and variations thereof may be made without departing from the spirit or scope of the invention.

What is claimed is:

1. A hydraulic system for ship rudder roll stabilization and steering which comprises:
    a hydraulically operated steering engine for controlling position of a rudder;
    first supply means for delivering a hydraulic fluid to the steering engine, comprising a constant delivery pump and a pressure accumulator connected to the constant delivery pump and a valve gear for controlling period, direction and rate of flow of the hydraulic fluid to and from the steering engine,
    and second supply means, for delivering a hydraulic fluid to the steering engine, comprising a steering pump and a slide valve for controlling period and direction of flow of the hydraulic fluid to and from the steering engine,
    whereby said first and said second supply means are alternately to be utilized, and
    whereby said first supply means are capable of effecting a rapid movement of the rudder over a restricted rudder angle and said second supply means are capable of effecting a movement of the rudder over the full rudder angle at a usual rudder rate.

2. The hydraulic system according to claim 1 for a ship having twin rudders with a steering engine for each rudder further comprising:
    said second supply means for each of the rudders for steering and said first supply means for steering and stabilization comprising: a constant delivery pump and a pressure accumulator and for each of the steering engines; and a separate valve gear unit which said first and said second supply means utilize alternately.

3. A hydraulic system for ship rudder roll stabilization and steering which comprises:
    a hydraulically operated steering engine for controlling position of a rudder;
    a constant delivery pump for supplying a pressurized hydraulic fluid into said hydraulic system;
    a pressure accumulator for receiving said pressurized hydraulic fluid supplied by said constant delivery pump while a flow of hydraulic fluid to said steering engine is interrupted, and for boosting said constant delivery pump in supplying said pressurized hydraulic fluid to said steering engine while said steering engine is operating; and
    a valve gear unit for controlling said flow of hydraulic fluid to and from said steering engine, said valve gear unit being arranged in said hydraulic system between said steering engine and said accumulator boosted pump, and being actuated by signals which depend on steering command signals and roll reduction signals, wherein said valve gear unit comprises a proportional control valve for controlling period of, direction of, and flow rate of said pressurized hydraulic fluid to said steering engine, and a load compensation device for controlling said flow of hydraulic fluid returning from said steering engine to compensate for loads having any influence upon said rudder.

4. The hydraulic system according to claim 3 wherein said constant delivery pump has a delivery of said pressurized hydraulic fluid into said hydraulic system which is 50 percent of a maximum amount of supply of said pressurized hydraulic fluid to said steering engine required to effect a maximum stroke of said rudder at a predetermined highest rudder rate, and wherein the capacity of said accumulator is such that said accumulator is capable of supplying a further 50 percent of said maximum amount of supply of said pressurized hydraulic fluid in addition to the constant delivery of said pump.

5. The hydraulic system according to claim 3 wherein said constant delivery pump is settable to no-load run without counter-pressure as long as a predetermined maximum pressure prevails in said accumulator.

6. A hydraulic system for ship rudder roll stabilization and steering which is connectable to a hydraulically operated steering engine for controlling position of a rudder, said hydraulic system comprising:
    a constant delivery pump for supplying a pressurized hydraulic fluid into said hydraulic system;
    a pressure accumulator for receiving said pressurized hydraulic fluid supplied by said constant delivery pump while a flow of hydraulic fluid to said steering engine is interrupted, and for boosting said constant delivery pump in supplying said pressurized hydraulic fluid to said steering engine while said steering engine is operating; and
    a valve gear unit for controlling said flow of hydraulic fluid to and from said steering engine, said valve gear unit being arranged in said hydraulic system between said steering engine and said accumulator boosted pump, and being actuated by signals which depend on steering command signals and roll reduction signals, wherein said valve gear unit comprises a proportional control valve for controlling period of, direction of, and flow rate of said pressurized hydraulic fluid to said steering engine, and a load compensation device for controlling said flow of hydraulic fluid returning from said steering engine to compensate for loads having any influence upon said rudder.

7. The hydraulic system according to claim 6 wherein said constant delivery pump has a delivery of said pressurized hydraulic fluid into said hydraulic system which is 50 percent of a maximum amount of supply of said pressurized hydraulic fluid to said steering engine required to effect a maximum stroke of said rudder at a predetermined highest rudder rate, and wherein the capacity of said accumulator is such that said accumulator is capable of supplying a further 50 percent of said maximum amount of supply of said pressurized hydraulic fluid in addition to the constant delivery of said pump.

8. The hydraulic system according to claim 6 wherein said constant delivery pump is settable to no-load run without counter-pressure as long as a predetermined maximum pressure prevails in said accumulator.

* * * * *